May 17, 1960  J. E. PALMER  2,936,632
ANTI-FRICTION DRIVE MEANS
Original Filed June 27, 1955

INVENTOR
JOHN E. PALMER

United States Patent Office 2,936,632
Patented May 17, 1960

2,936,632

ANTI-FRICTION DRIVE MEANS

John E. Palmer, Calgary, Alberta, Canada

Original application June 27, 1955, Serial No. 518,270. Divided and this application March 3, 1958, Serial No. 718,908

2 Claims. (Cl. 74—49)

This application is a divisional application of my United States patent application Serial No. 518,270 filed June 27, 1955 and now Patent No. 2,825,289, and the principal object of this invention is to provide anti-friction drive means for a plurality of opposed pairs of connecting rods adapted to be driven from a single offset crank pin.

Although this drive means is particularly suitable for multiple cylinder radial pumps, nevertheless, it will be appreciated that it can be used effectively with any form of pistons, plungers or metering rods in which opposed pairs are utilized and which are driven from a common or single offset crank pin.

With the extensive advancement of chemical spraying and hydraulic power transmission, a significant requirement has developed for pumping equipment capable of improving the shortcomings that are prevalent in present day pumps. Conventional piston and plunger type pumps have long been recognized as the ideal medium of transferring fluids of corrosive and abrasive characteristics and at high or low pressures. However, the greatest objection to these pumps is the high initial cost and lack of versatile application due to construction principles that involve box driving mechanism and further stability.

The advantages of the new drive principle disclosed herewith become more obvious when it is appreciated that the power is transmitted to multiples of radially located pistons through the medium of bearings mounted in parallel on the same crank pin. It can be further appreciated that sliding friction has been virtually eliminated due to the rolling action of the crank pin bearing which are permitted to actuate multiples of pistons without interference with each other due to the speed changes of piston travel that occur from the alternating crank angles when in motion.

Conventional bearings normally used on types of multiple yokes drives, all incorporate rubbing or sliding friction which is encountered when transferring thrusts in different directions at the same time. This sliding friction is responsible for excessive heat and wear and consequently an adequate and substantial means of lubrication is an essential requirement for transfer of high pressure or power thrusts.

Always assuming that adequate means of lubrication could be provided for, a major objection would still be evident particularly when the drive was used in a pumping application for the transfer of corrosive or abrasive materials.

Under these conditions, leakage always occurs and such leakage readily enters into the lubrication area of the conventional drive, therefore causing damage and drive failure.

By utilizing the normal rolling action and by utilizing steel bearings, which are readily available, I am able to overcome these disadvantages as well as providing a drive which requires less power than heretofore.

Another object of my invention is therefore to provide a device of the character herewithin described which permits the operation of multiples of yokes particularly in combination with pistons, plungers or metering rods, from a single crank pin or eccentric.

Another object of my invention is to provide a device of the character herewithin described which eliminates rubbing or sliding friction from the bearing area and thereby overcoming heat and wear.

Yet another object of my invention is to provide a device of the character herewithin described which overcomes the hazard of contamination from leaking conditions that occur from time to time with many types of applications such as pump applications, wherein they are utilized for the transference of corrosive and abrasive materials.

Another object of my invention is to provide a device of the character herewithin described which reduces the need of expensive crank shafts with multiple cranks and incorporating hinged or pivoted action connecting rods etc., which are commonly used to achieve smooth harmony through the medium of multiples of pistons.

Still another object of my invention is to provide a device of the character herewithin described which is extremely simple in construction, economical in operation, and otherwise well suited for the purpose to which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
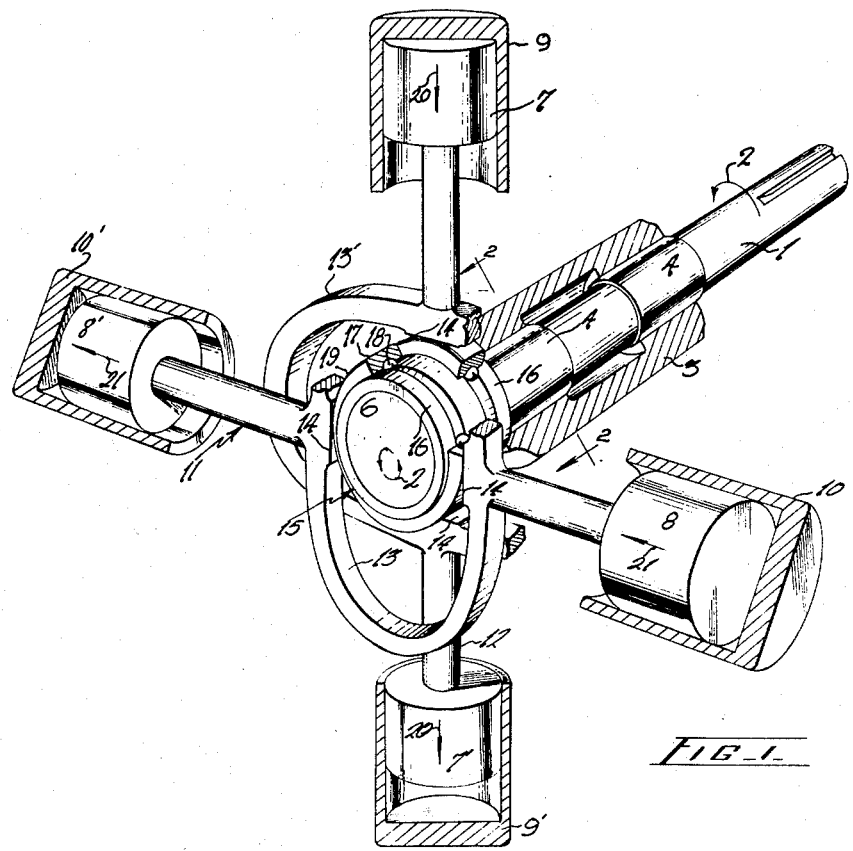
Figure 1 is a perspective view of my device, shown in a piston and cylinder application and sectioned in part to show the interior thereof.
Figure 2:
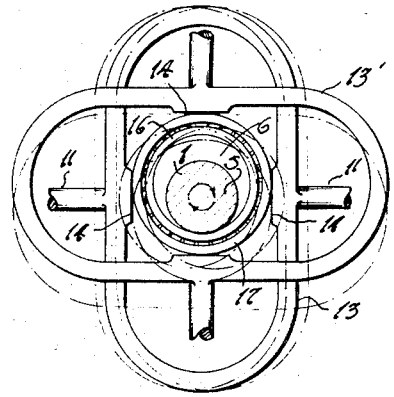
Figure 2 is a front elevational view of the yokes, drive shaft, and offset crank pin.

Proceeding now to describe my invention in detail, reference should be made to the accompanying drawings in which I have illustrated a drive shaft 1 adapted to be driven from a conventional source of power (not illustrated) in the direction of arrow 2. This drive shaft is supported within a bearing assembly 3 and contains a pair of bearings 4 in this particular embodiment.

Upon the front end 5 of this drive shaft, I have provided an offset crank pin 6 so that when the drive shaft 1 is revolved, this crank pin rotates eccentrically with respect to the drive shaft.

In this particular embodiment I have illustrated the device in conjunction with two opposed pairs of pistons 7, 7' and 8, 8', each piston reciprocating within a fixed cylinder 9, 9' and 10, 10' but it will be appreciated that the invention is applicable to any form of drive requiring opposed reciprocation.

It will also be appreciated that although I have shown two pairs of opposed pistons situated at 90 degrees with respect to one another, nevertheless further multiples of pistons may be added provided the angular relationship one with the other is equal so that balance is obtained when the assembly is operating.

Each pair of pistons are connected to a unitary connecting rod assembly collectively designated 11 and 12, each connecting rod being provided with an open faced elongated rectangular bearing or yoke 13 medially along the length thereof.

In other words, each open frame-like yoke 13 is provided with a connecting rod upon each side thereof.

Each of the yokes 13 and 13' is provided with bearing surfaces 14 upon the inner surfaces thereof diametrically opposite one with the other and adjacent the connecting rods extending therefrom, and each yoke is provided with anti-friction bearing means collectively designated 15 mounted upon the offset crank pin 6 as will hereinafter be described.

It will be observed from the drawings that the yokes 13 and 13' are situated one behind the other and that each yoke is provided with its own anti-friction means 15 operating independently.

Each anti-friction means consists of an inner race means 16 secured to the offset crank pin 6 and rotatable thereby.

An outer annular race means 17 surround the inner race means with ball bearings 18 being provided between the two races so that the outer race means may rotate freely around the inner race means.

The outer surface 19 of the outer race means contacts the aforementioned bearing surfaces 14 for rolling engagement therebetween thus eliminating any sliding or slipping contact during the operation of the device.

Rotation of the drive shaft 1 by the aforementioned source of power, causes the offset crank pin 6 to rotate carrying with it the anti-friction bearings 15.

As each connecting rod is engaged by a separate bearing assembly, the connecting rod is reciprocated with the outer race means 17 merely rolling along the bearing surfaces 14 thus eliminating the sliding friction which would be present if one bearing operated both connecting rods. In this connection it will be appreciated that the distance between the opposed bearing surfaces 14 is sufficient that the outer race means 17 are a clearance fit therewithin.

With this construction and assuming that the crank pin 6 is rotating in the direction of arrow 2, the position of the component illustrated in Figure 1 will follow in the sequence now to be described.

Perusal of Figure 1 will show that the piston 7 is at top dead centre and that the offset crank pin 6 is also at top dead centre. The crank pin 6, during its revolution through the last 90° in an anticlockwise direction, has caused the outer rear race means 17 to move from the extreme right of the bearing contact 14 to the centre thereof.

Referring to the next 180° of rotation of the crank pin 6 (with reference to Figure 1), of the piston and cylinder assemblies (7, 7' and 9, 9'), these will be moved downwardly in the direction of arrow 20. The outer race means 17 of the rear bearing assembly 15 will roll first from this central position to the left and then from the left back to the central position upon the bearing surfaces 14, all of the load being on the lower bearing surface 14. During the second 180° of rotation of the crank pin 6, this outer race means 17 will roll from the centre to the right position and back to the central position with however all of the load being upon the upper bearing surface of this particular yoke.

In the original position shown in Figure 1, the lefthand piston 8' and the righthand piston 8 will be in their mid positions within the cylinders, the front outer race means 17 being at its uppermost position upon the bearing surface 14, it having travelled from the centre of bearing surface 14 upwardly during the previous 90° of rotation of the crank pin.

During the aforementioned first 180° rotation of the crank pin, the front outer race means 17 will travel to the centre of the bearing surface 14 and then downwardly to the lowermost position upon the bearing surface 14. However, it should be noted that the rolling thrust is transferred after the first 90° of travel, (0°–90°) from the lefthand bearing surface 14 to the righthand bearing surface 14 (all with relation to Figure 1) during the second 90° of this phase (90°–180°).

During the second aforementioned 180° of rotation of the crank pin 6, the front outer race means 17 travels from the lowermost position with reference to the bearing surfaces 14, upwardly towards the centre position during the first 90° and from the central position to the uppermost position, through the second 90° of this phase. During the first 90° rotation of this phase (180°–270°) the rolling thrust is against the righthand bearing surface 14 and is then transferred for the second 90°, (270°– 360°) of this phase back to the lefthand bearing surface 14.

At all times, it will be noted that the outer race means 17 is in rolling contact with the bearing surfaces and that all rubbing or slipping contact is avoided.

It will also be observed that the eccentric bearings alter direction every 90° and that two of them never revolve in the same direction at the same time. Furthermore, they never revolve at the same speed in relation to one another and this also applies if three or more sets of yokes were to be operated from a single crank pin.

In conclusion, it should be stressed that I have provided a means of transmitting a rolling thrust to multiples of piston yokes radially disposed around a single offset crank pin eliminating, almost entirely, any rubbing or sliding friction that is present and thus relieving lubrication and wear problems considerably.

Since various modifications can be made in my invention as hereinabove described, and many apparently widely different embodiments of same made within the spirit and scope of the claims without departing from such spirit and scope, it is intended that all matter contained in the accompanying specifications shall be interpreted as illustrative only and not in a limiting sense.

What I claim as my invention is:

1. In a mechanism for converting rotary motion of a single-throw crankshaft into reciprocating movement of a plurality of pairs of radially opposed connecting rods, the combination of a rotatable shaft having a single crank, anti-friction bearing means provided on said crank and including inner race means secured to the crank for rotation therewith, a plurality of coaxially juxtaposed and independently rotatable outer races surrounding said inner race means, and sets of anti-friction elements interposed between the inner race means and the respective outer races, a plurality of reciprocable frames each including an elongated yoke and a pair of coaxial connecting rods secured thereto, said rods extending radially outwardly in opposite directions from said yoke at right angles to the longitudinal axis of the yoke and the axes of the pairs of rods of the respective frames being angularly offset from one another in a plane transverse to the axis of said shaft, and means for reciprocably guiding said rods, the yokes of said frames being coplanar with and surrounding the respective outer races of said bearing means and the inside dimension of said yokes along the axes of the associated pairs of rods being greater than the outside diameter of said outer races, whereby each outer race may operatively engage the associated yoke with a rolling contact alternately at opposite side portions of the yoke adjacent the connecting rods thereof to impart reciprocating movement thereto during rotation of said shaft and whereby rotation of the respective outer races relative to said inner race means may occur at different times and at different speeds and in different directions independently of one another.

2. The device as defined in claim 1 together with elongated protuberances provided at the inside of said yokes adjacent said connecting rods, said protuberances having flat inner faces engageable with the respective outer races of said bearing means.

References Cited in the file of this patent
UNITED STATES PATENTS

| | | |
|---|---|---|
| 1,190,949 | Philippe | July 11, 1916 |
| 1,998,083 | Grob et al. | Apr. 16, 1935 |
| 2,122,676 | Baurke | July 5, 1938 |
| 2,355,011 | Putnam | Aug. 1, 1944 |
| 2,683,422 | Richards | July 13, 1954 |
| 2,831,438 | Guinard | Apr. 22, 1958 |

FOREIGN PATENTS

| | | |
|---|---|---|
| 442,799 | France | June 28, 1912 |
| 348,031 | Italy | May 5, 1937 |